US012730595B2

(12) United States Patent
Morishita

(10) Patent No.: US 12,730,595 B2
(45) Date of Patent: Sep. 8, 2026

(54) PRINTING APPARATUS AND METHOD FOR CONTROLLING PRINTING APPARATUS COMPRISING PERFORMING FIRST RECONNECTION PROCESSING WITH A FIRST SWITCHING CIRCUIT WHEN A MAIN CONTROLLER DOES NOT RECEIVE A RESPONSE FROM A SECOND CONTROLLER AND RECEIVES A RESPONSE FROM A FIRST CONTROLLER

(71) Applicant: SEIKO EPSON CORPORATION, Tokyo (JP)

(72) Inventor: Kazuya Morishita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 18/782,046

(22) Filed: Jul. 24, 2024

(65) Prior Publication Data

US 2025/0036333 A1 Jan. 30, 2025

(30) Foreign Application Priority Data

Jul. 24, 2023 (JP) ................................ 2023-120058

(51) Int. Cl.
*H04N 1/32* (2006.01)
*G06F 3/12* (2006.01)

(52) U.S. Cl.
CPC .......... *G06F 3/1236* (2013.01); *G06F 3/1232* (2013.01)

(58) Field of Classification Search
CPC .......... H04N 1/32609; H04N 1/32614; H04N 1/32619; H04N 1/32667; H04N 1/327; H04N 1/00976; H04N 1/04; H04N 1/1013; H04N 2201/0081; B65H 2557/10; (Continued)

(56) References Cited

U.S. PATENT DOCUMENTS 9,935,476 B2 * 4/2018 Zhang ....................... H02J 7/02
2004/0146313 A1 * 7/2004 Uchizono .......... G03G 15/5083 399/75
2007/0001379 A1 * 1/2007 Oh ....................... B41J 13/0009 271/145

FOREIGN PATENT DOCUMENTS

JP 2008049593 A 3/2008
JP 2009286101 A 12/2009
JP 2022096897 A 6/2022

* cited by examiner

*Primary Examiner* — Chad Dickerson
(74) *Attorney, Agent, or Firm* — CHIP LAW GROUP

(57) ABSTRACT

A copier includes a main controller, a first communication switching circuit, and a first controller and a second controller that are configured to communicate with the main controller via the first communication switching circuit. The main controller is configured to perform first connection processing of transmitting a first connection command to the first controller and second connection processing of transmitting a second connection command to the second controller. The main controller is configured to, when receiving first response information from the first controller and not receiving second response information from the second controller, perform first reconnection processing of causing the first communication switching circuit to disconnect communication and then causing the first communication switching circuit to connect communication, and, after performing the first reconnection processing, perform the first connection processing again.

9 Claims, 8 Drawing Sheets

(58) Field of Classification Search
CPC ...... B65H 3/44; B41J 13/0009; G06F 3/1232; G06F 3/1234; G06F 3/1236
USPC ................................................ 358/1.11–1.18
See application file for complete search history.

1
10
120
21A,21
220A
21B,21
220B
LC3,LC
LC2,LC
LC1,LC
FIRST COMMUNICATION SWITCHING CIRCUIT
SECOND COMMUNICATION SWITCHING CIRCUIT
THIRD COMMUNICATION SWITCHING CIRCUIT
MAIN CONTROLLER
FIRST CONTROLLER
SECOND CONTROLLER
100,130
LP
200A,230A
200B,230B
110
FIRST POWER SUPPLY SWITCHING CIRCUIT
210A
SECOND POWER SUPPLY SWITCHING CIRCUIT
210B
THIRD POWER SUPPLY SWITCHING CIRCUIT

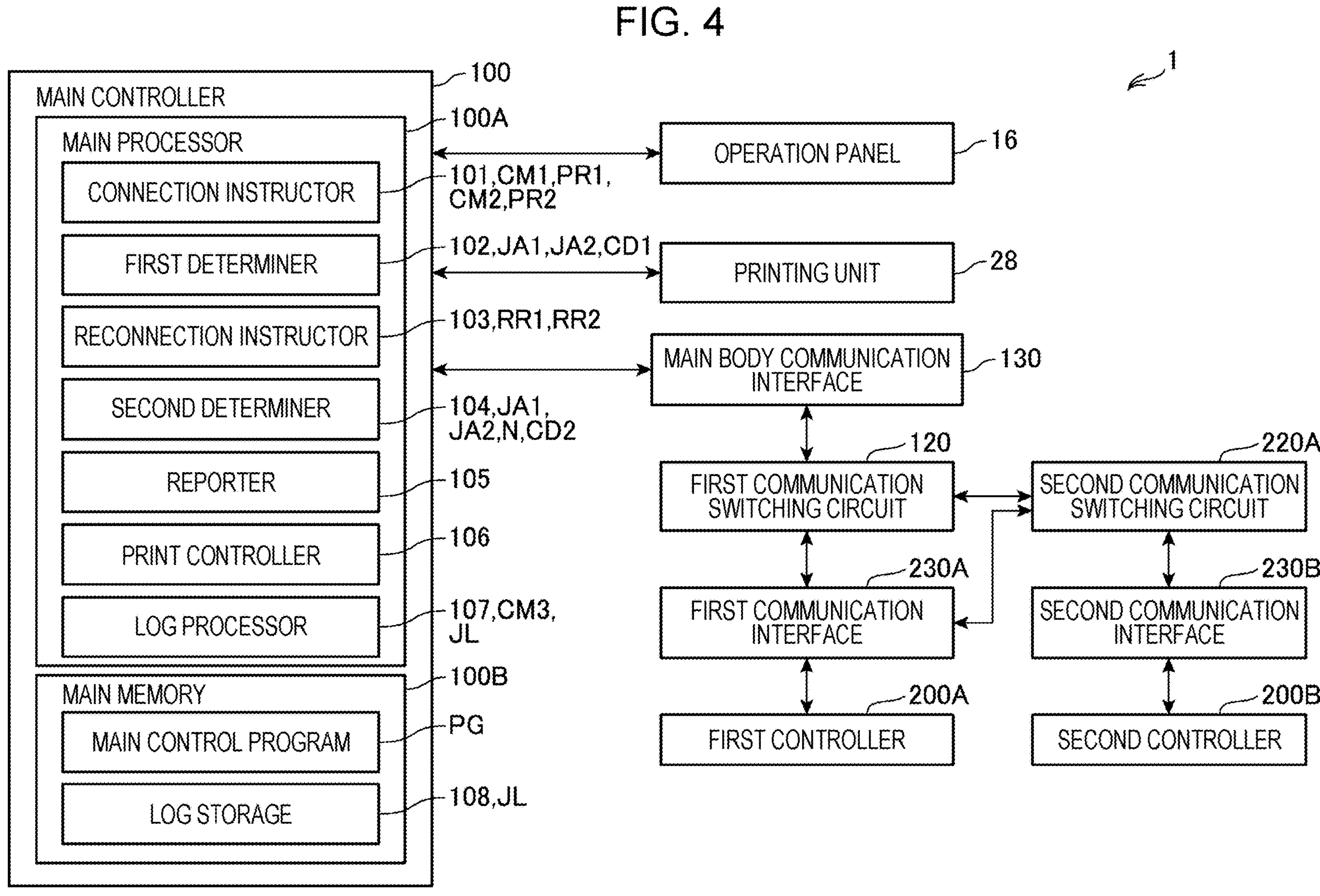

FIG. 4
1
100
MAIN CONTROLLER
100A
MAIN PROCESSOR
101,CM1,PR1, CM2,PR2
CONNECTION INSTRUCTOR
102,JA1,JA2,CD1
FIRST DETERMINER
103,RR1,RR2
RECONNECTION INSTRUCTOR
104,JA1, JA2,N,CD2
SECOND DETERMINER
105
REPORTER
106
PRINT CONTROLLER
107,CM3, JL
LOG PROCESSOR
100B
MAIN MEMORY
PG
MAIN CONTROL PROGRAM
108,JL
LOG STORAGE
16
OPERATION PANEL
28
PRINTING UNIT
130
MAIN BODY COMMUNICATION INTERFACE
120
FIRST COMMUNICATION SWITCHING CIRCUIT
230A
FIRST COMMUNICATION INTERFACE
200A
FIRST CONTROLLER
220A
SECOND COMMUNICATION SWITCHING CIRCUIT
230B
SECOND COMMUNICATION INTERFACE
200B
SECOND CONTROLLER

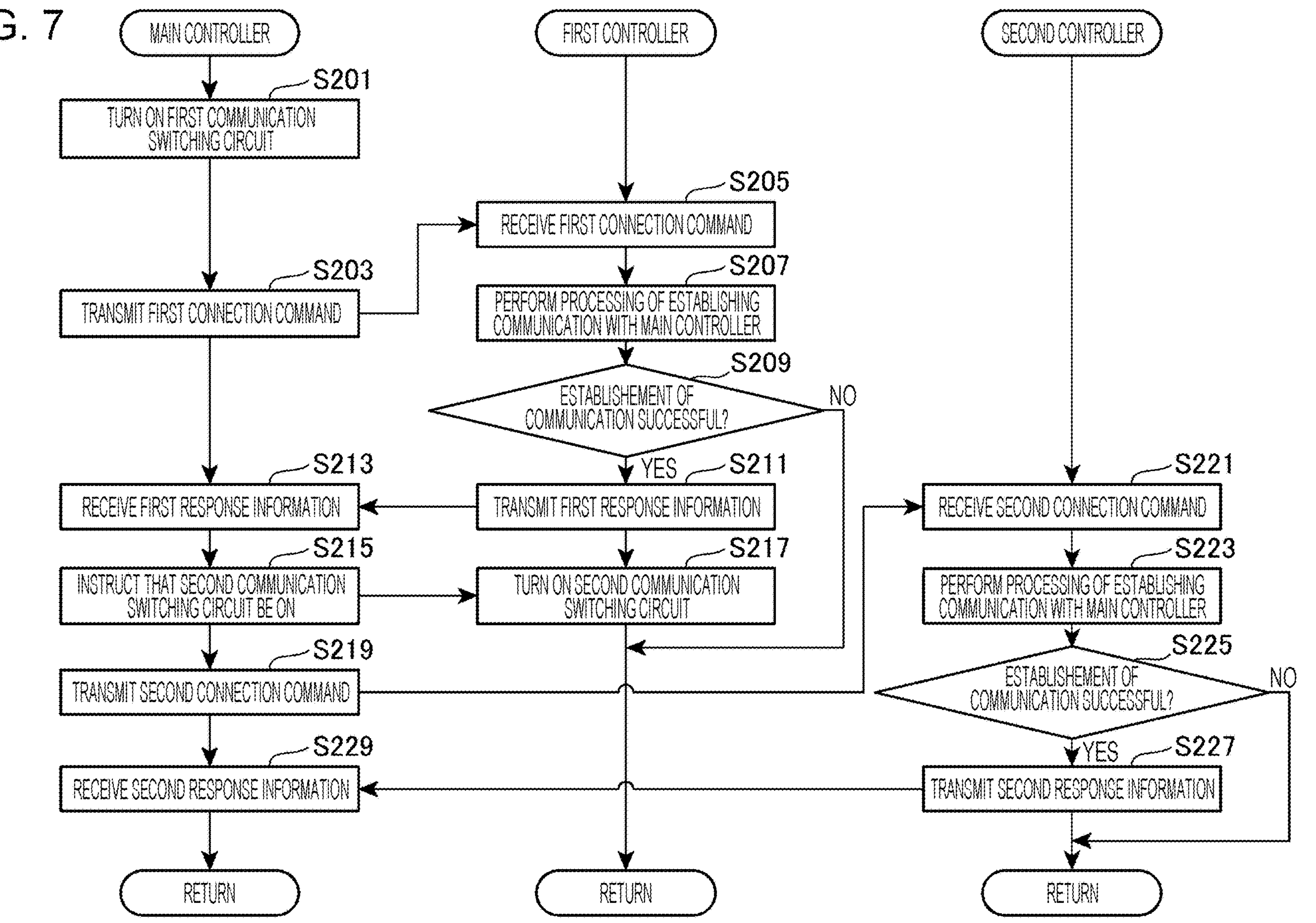

FIG. 7
MAIN CONTROLLER
FIRST CONTROLLER
SECOND CONTROLLER
S201
TURN ON FIRST COMMUNICATION SWITCHING CIRCUIT
S205
RECEIVE FIRST CONNECTION COMMAND
S203
TRANSMIT FIRST CONNECTION COMMAND
S207
PERFORM PROCESSING OF ESTABLISHING COMMUNICATION WITH MAIN CONTROLLER
S209
ESTABLISHEMENT OF COMMUNICATION SUCCESSFUL?
NO
YES
S213
RECEIVE FIRST RESPONSE INFORMATION
S211
TRANSMIT FIRST RESPONSE INFORMATION
S221
RECEIVE SECOND CONNECTION COMMAND
S215
INSTRUCT THAT SECOND COMMUNICATION SWITCHING CIRCUIT BE ON
S217
TURN ON SECOND COMMUNICATION SWITCHING CIRCUIT
S223
PERFORM PROCESSING OF ESTABLISHING COMMUNICATION WITH MAIN CONTROLLER
S219
TRANSMIT SECOND CONNECTION COMMAND
S225
ESTABLISHEMENT OF COMMUNICATION SUCCESSFUL?
NO
YES
S229
RECEIVE SECOND RESPONSE INFORMATION
S227
TRANSMIT SECOND RESPONSE INFORMATION
RETURN
RETURN
RETURN

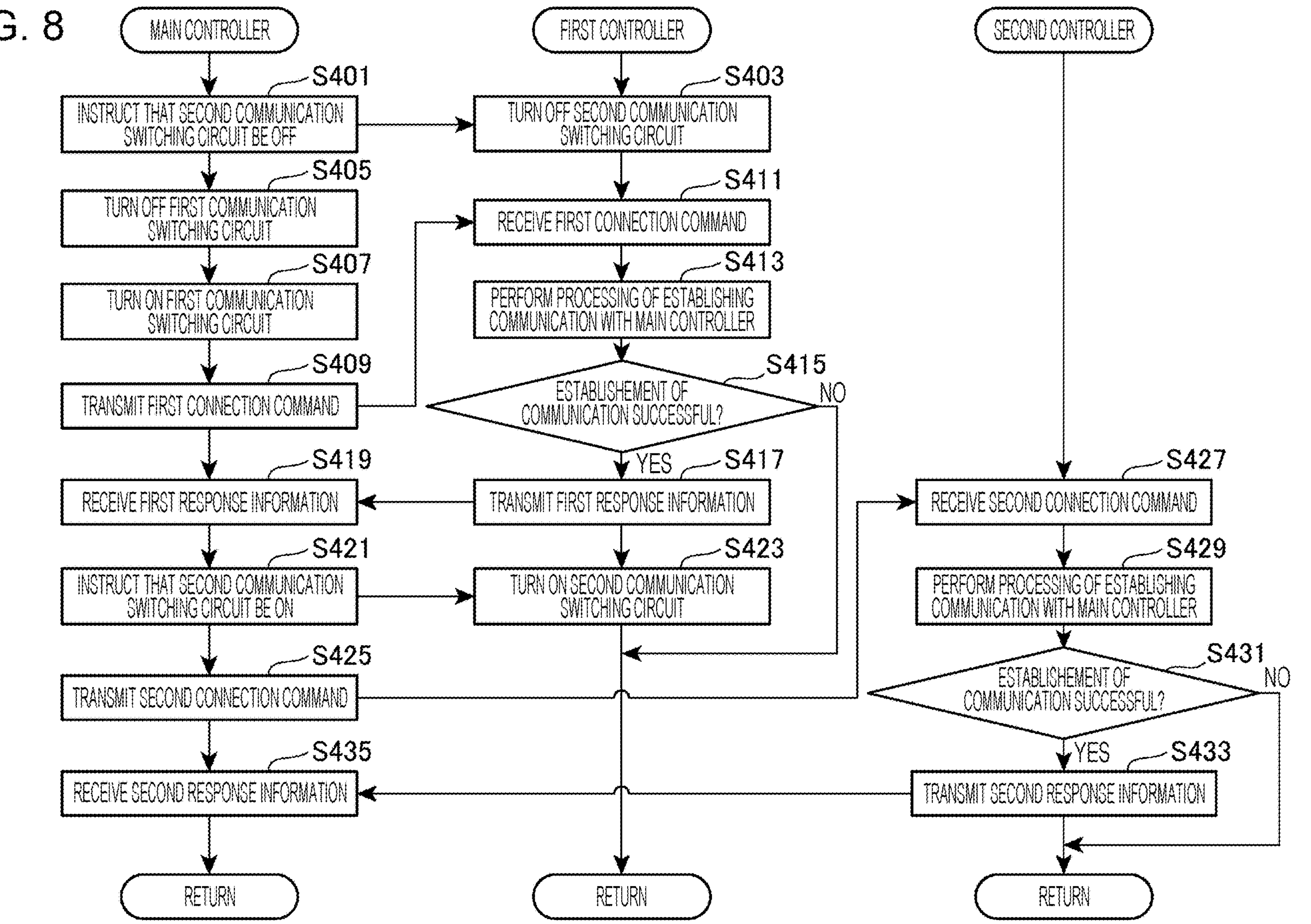
FIG. 8
MAIN CONTROLLER
FIRST CONTROLLER
SECOND CONTROLLER
S401
INSTRUCT THAT SECOND COMMUNICATION SWITCHING CIRCUIT BE OFF
S403
TURN OFF SECOND COMMUNICATION SWITCHING CIRCUIT
S405
TURN OFF FIRST COMMUNICATION SWITCHING CIRCUIT
S411
RECEIVE FIRST CONNECTION COMMAND
S407
TURN ON FIRST COMMUNICATION SWITCHING CIRCUIT
S413
PERFORM PROCESSING OF ESTABLISHING COMMUNICATION WITH MAIN CONTROLLER
S409
TRANSMIT FIRST CONNECTION COMMAND
S415
ESTABLISHEMENT OF COMMUNICATION SUCCESSFUL?
NO
YES
S417
TRANSMIT FIRST RESPONSE INFORMATION
S419
RECEIVE FIRST RESPONSE INFORMATION
S427
RECEIVE SECOND CONNECTION COMMAND
S421
INSTRUCT THAT SECOND COMMUNICATION SWITCHING CIRCUIT BE ON
S423
TURN ON SECOND COMMUNICATION SWITCHING CIRCUIT
S429
PERFORM PROCESSING OF ESTABLISHING COMMUNICATION WITH MAIN CONTROLLER
S425
TRANSMIT SECOND CONNECTION COMMAND
S431
ESTABLISHEMENT OF COMMUNICATION SUCCESSFUL?
NO
YES
S433
TRANSMIT SECOND RESPONSE INFORMATION
S435
RECEIVE SECOND RESPONSE INFORMATION
RETURN
RETURN
RETURN

PRINTING APPARATUS AND METHOD FOR CONTROLLING PRINTING APPARATUS COMPRISING PERFORMING FIRST RECONNECTION PROCESSING WITH A FIRST SWITCHING CIRCUIT WHEN A MAIN CONTROLLER DOES NOT RECEIVE A RESPONSE FROM A SECOND CONTROLLER AND RECEIVES A RESPONSE FROM A FIRST CONTROLLER

The present application is based on, and claims priority from JP Application Serial Number 2023-120058, filed Jul. 24, 2023, the disclosure of which is hereby incorporated by reference herein in its entirety.

BACKGROUND

1. Technical Field

The present disclosure relates to a printing apparatus and a method for control a printing apparatus.

2. Related Art

A known printing apparatus includes an additional cassette that may hold print media, such as sheets of paper. For example, JP-A-2009-286101 describes that an error notification is issued when an additional cassette is not normally mounted.

As exemplified in JP-A-2009-286101, an additional cassette may cause an error. Therefore, even when an error related to the additional cassette occurs, it is desirable that the chance of error recovery be increased by controlling the printing apparatus main body.

SUMMARY

An aspect of the present disclosure is a printing apparatus including a main body including a printing section, a main controller, and a first switching circuit configured to connect or disconnect communication; a first cassette including a first controller configured to communicate with the main controller via the first switching circuit; and a second cassette including a second controller configured to communicate with the main controller via the first switching circuit. The main controller is configured to perform first connection processing of transmitting, to the first controller, a first connection command that provides an instruction for establishing communication with the main controller, and perform second connection processing of transmitting, to the second controller, a second connection command that provides an instruction for establishing communication with the main controller. The main controller is configured to, when receiving, from the first controller, first response information indicating establishment of communication with the main controller and not receiving, from the second controller, second response information indicating establishment of communication with the main controller, perform first reconnection processing of causing the first switching circuit to disconnect communication and then causing the first switching circuit to connect communication, and, after performing the first reconnection processing, perform the first connection processing again.

Another aspect of the present disclosure is a method for controlling a printing apparatus including a main body including a printing section, a main controller, and a first switching circuit configured to connect or disconnect communication; a first cassette including a first controller configured to communicate with the main controller via the first switching circuit; and a second cassette including a second controller configured to communicate with the main controller via the first switching circuit. The method includes, by the main controller, performing first connection processing of transmitting, to the first controller, a first connection command that provides an instruction for establishing communication with the main controller, and performing second connection processing of transmitting, to the second controller, a second connection command that provides an instruction for establishing communication with the main controller, and, by the main controller, when receiving, from the first controller, first response information indicating establishment of communication with the main controller and not receiving, from the second controller, second response information indicating establishment of communication with the main controller, performing first reconnection processing of causing the first switching circuit to disconnect communication and then causing the first switching circuit to connect communication, and, after performing the first reconnection processing, performing the first connection processing again.

BRIEF DESCRIPTION OF THE DRAWINGS

FIG. 4 is a block diagram illustrating an example of the configuration of a main controller.

FIG. 7 is a flowchart presenting an example of a communication establishing process by the main controller, the first controller, and the second controller.

FIG. 8 is a flowchart presenting an example of a retry process by the main controller, the first controller, and the second controller.

DESCRIPTION OF EMBODIMENTS

Hereafter, embodiments will be described with reference to the accompanying drawings.

Figure 1:
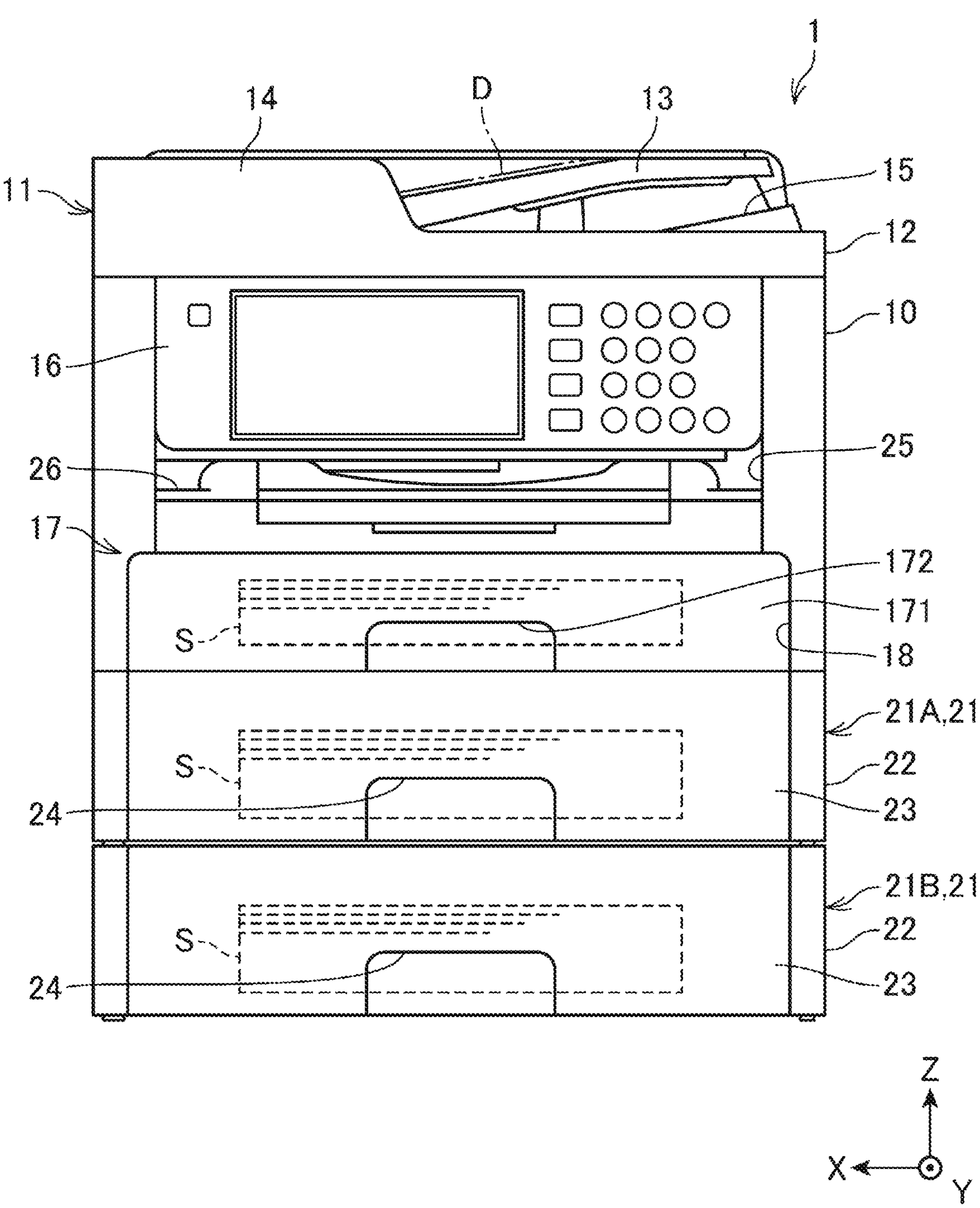
FIG. 1 is a front view illustrating an example of a copier.
Figure 2:
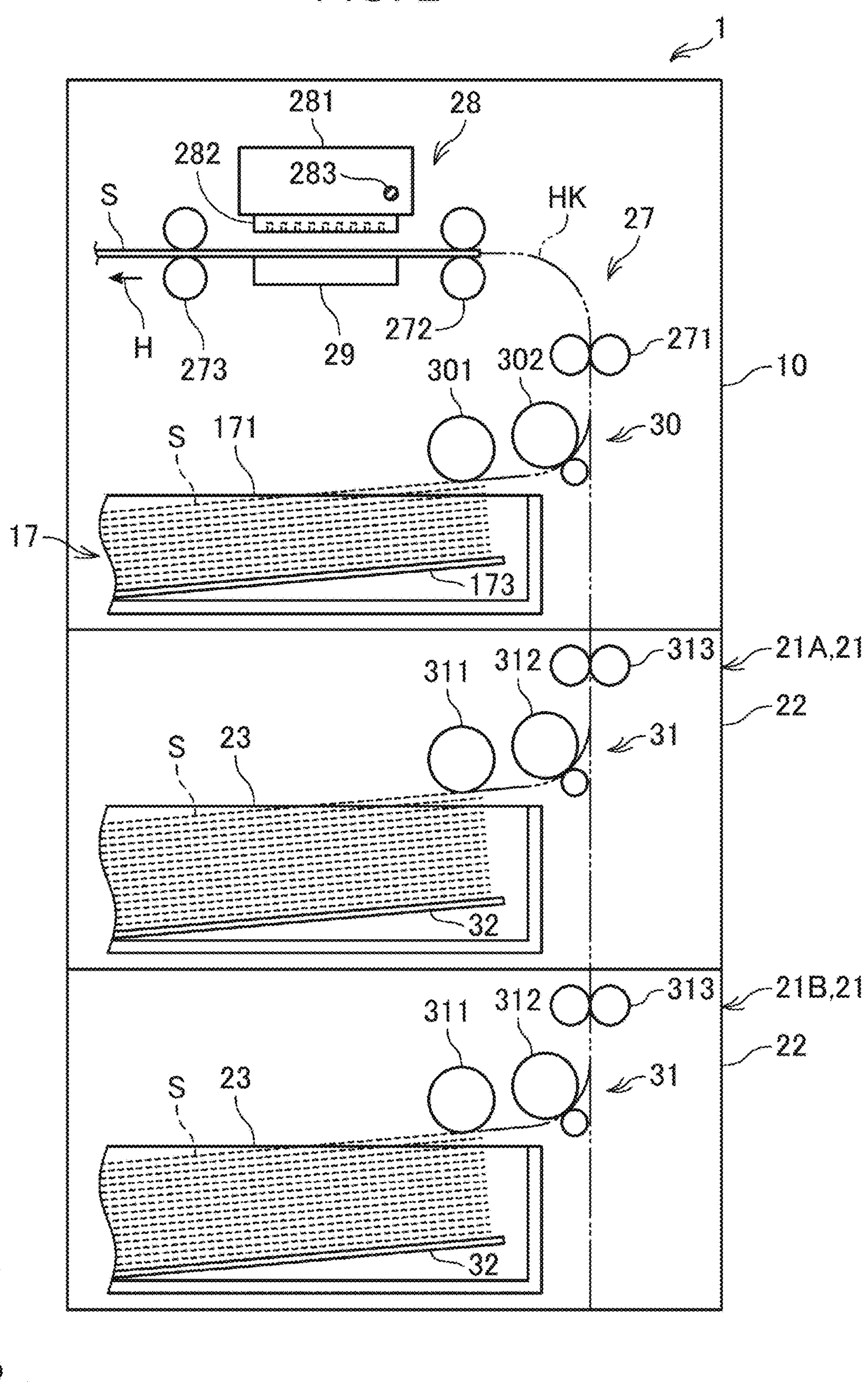
FIG. 2 schematically illustrates an example of a side cross section of the copier.

In FIGS. 1 and 2, an X-axis, a Y-axis and a Z-axis are illustrated. The X-axis, Y-axis, and Z-axis are perpendicular to each other. The Z-axis indicates the up-down direction and the vertical direction in an installation state of the copier 1. Each of the X-axis and the Y-axis is parallel to the horizontal direction. The Y-axis indicates the front-rear direction of the copier 1. The X-axis indicates the left-right direction of the copier 1. The positive direction of the Z-axis indicates the upward direction. The positive direction of the Y-axis indicates the front direction. The positive direction of the X-axis indicates the left direction. The surface at the front of the copier 1 is the front of the copier 1.

FIG. 1 is a front view illustrating the copier 1.

The copier 1 in the present embodiment has print functionality and copying functionality.

The copier 1 corresponds to an example of a printing apparatus.

Although the present embodiment illustrates the case in which the printing apparatus is the copier 1, the present disclosure is not limited to this. The printing apparatus may have print functionality. For example, the printing apparatus may be a printer. In addition, for example, the printing apparatus may be a multi function peripherals (MFP). The MFP is a multi-function printer having various types of functionality such as print functionality, copying functionality, facsimile functionality, and scan functionality.

The copier 1 includes a reading unit 11 in an upper portion of an apparatus main body 10. The reading unit 11 includes a cover 12 disposed to be openable and closable on an upper surface of the apparatus main body 10, an original tray 13 mounted on the cover 12, and an automatic original feeding device 14. The reading unit 11 reads an original document D the sheets of which are transported one by one from the original tray 13 by the automatic original feeding device 14 or reads the original document D set on a glass platen that is exposed when the cover 12 is opened. The original document D read by the reading unit 11 is discharged onto a discharge tray 15.

The apparatus main body 10 corresponds to an example of a main body.

An operation panel 16 is disposed in an upper portion of the front of the apparatus main body 10. The operation panel 16 includes devices such as a plurality of operating switches, a display, and a touch panel.

The copier 1 includes a main body cassette 17. The main body cassette 17 is disposed in a recess 18 formed at a position below the operation panel 16 in the apparatus main body 10. The main body cassette 17 includes a main body tray 171 that may hold a print medium S, such as sheets of paper, in a stacked manner. The main body tray 171 may hold one or more sheets of the print medium S. On the front of the main body tray 171, a grip 172, which is used when the user pulls out the main body tray 171, is formed.

The copier 1 includes a first additional cassette 21A and a second additional cassette 21B below the apparatus main body 10. The first additional cassette 21A and the second additional cassette 21B will be hereafter referred to as additional cassettes and denoted by 21 when they are not discriminated to each other.

The first additional cassette 21A corresponds to an example of a first cassette.

The second additional cassette 21B corresponds to an example of a second cassette.

The first additional cassette 21A and the second additional cassette 21B have substantially the same configuration. Therefore, in describing the configuration of the additional cassette 21 with reference to FIG. 1, the configuration of the first additional cassette 21A will be described, and the description of the configuration of the second additional cassette 21B will be omitted.

The first additional cassette 21A includes a housing 22 and an additional tray 23 mounted in the housing 22. The additional tray 23 may hold one or more sheets of the print medium S. The number of sheets of the print media S that the additional tray 23 may hold may be larger, smaller, or the same as the number of sheets of the print media S that the main body cassette 17 may hold. On the front of the additional tray 23, a grip 24, which is used when the user pulls out the additional tray 23, is formed.

In response to receiving a print job from an external device, such as a personal computer (PC), the copier 1 identifies a cassette corresponding to the information on the print medium S indicated by the received print job and transports the print medium S from the identified cassette. The print job includes information on the print medium S on which printing is to be performed, image data to be formed on the print medium S, various control commands in compliance with the command system of the copier 1, and so on. The copier 1 performs printing on the print medium S by performing operations based on various control commands included in the print job and image data included in the print job. This is expressed as print job execution. The copier 1 ejects ink supplied from an ink container (not shown) on the print medium S transported along a transport path HK described later formed in the apparatus main body 10 to perform printing.

The printed print medium S is discharged from a discharge port 25 that opens between the operation panel 16 and the main body cassette 17 in the apparatus main body 10. At a lower portion of the discharge port 25, a sliding discharge tray 26, which is constructed in a multilayered fashion so as to be extensible and contractable in the front-rear direction, is disposed. The print medium S discharged from the discharge port 25 is loaded on the extended discharge tray 26.

FIG. 2 schematically illustrates an example of a side cross section of the copier 1.

The first additional cassette 21A and the second additional cassette 21B have substantially the same configuration. Therefore, in describing the configuration of the additional cassette 21 with reference to FIG. 2, the configuration of the first additional cassette 21A will be described, and the description of the configuration of the second additional cassette 21B will be omitted as appropriate.

The apparatus main body 10 includes a first main body transporter 27. The first main body transporter 27 transports the print medium S, which has been transported from the main body cassette 17 or the additional cassette 21, in a transport direction H. The first main body transporter 27 includes a first main body transport roller pair 271, a second main body transport roller pair 272, and a third main body transport roller pair 273. Each of the first main body transport roller pair 271, the second main body transport roller pair 272, and the third main body transport roller pair 273 includes a drive roller that is rotated by the power of a motor, and a driven roller that is driven with rotation of the drive roller. The second main body transport roller pair 272 is disposed downstream of the first main body transport roller pair 271 in the transport direction H of the print medium S. The third main body transport roller pair 273 is disposed downstream of the second main body transport roller pair 272 in the transport direction H of the print medium S.

The copier 1 includes a printing unit 28. As illustrated in FIG. 2, the printing unit 28 is disposed between the second main body transport roller pair 272 and the third main body transport roller pair 273 in the transport direction H. The printing unit 28 includes a carriage 281 and an ink jet head 282 mounted on the carriage 281.

The printing unit 28 corresponds to an example of a printing section.

The carriage 281 is supported by a carriage axis 283 extending in a perpendicular direction, which is perpendicular to the transport direction H, and causes the ink jet head 282 to scan in the perpendicular direction along the carriage axis 283. The perpendicular direction is parallel to the X-axis.

The ink jet head 282 includes, for example, nozzle rows of four colors of CMYK. The ink jet head 282 is supplied with ink supplied from an ink container (not shown) and ejects ink from nozzles disposed in each nozzle row to form an image on the print medium S.

In the transport path HK of the print medium S, a platen 29 is disposed at a location facing the ink jet head 282. The platen 29 extends over a range in which the ink jet head 282 may form an image, and flattens and supports the print medium S such that the surface of the print medium S located on the platen 29 is perpendicular to the ejection direction of ink ejected from the ink jet head 282.

The apparatus main body 10 includes a second main body transporter 30. The second main body transporter 30 transports the print medium S held in the main body cassette 17, sheet by sheet, to the first main body transporter 27. The second main body transporter 30 includes a main body pickup roller 301 and a main body separation roller pair 302. The main body pickup roller 301 is a roller that feeds a sheet of the print medium S located uppermost among the sheets of the print medium S loaded on the main body tray 171 from the main body tray 171. The main body separation roller pair 302 transports the print medium S sheet by sheet toward the first main body transporter 27 even when a plurality of sheets of the print medium S fed by the main body pickup roller 301 are placed on top of each other. The main body separation roller pair 302 includes a drive roller and a driven roller that is driven by the rotation of the drive roller. The main body cassette 17 includes a hopper plate 173, on which the print medium S is loaded, in the main body tray 171. The main body cassette 17 presses the print medium S accommodated in the main body tray 171 against the main body pickup roller 301 by tilting the hopper plate 173.

The first additional cassette 21A includes an additional transporter 31. The additional transporter 31 transports the print medium S accommodated in the additional tray 23 of the first additional cassette 21A sheet by sheet into the apparatus main body 10. The additional transporter 31 includes an additional pickup roller 311, an additional separation roller pair 312, and an additional transport roller pair 313.

The additional pickup roller 311 is a roller that feeds a sheet of the print medium S located uppermost among sheets of the print medium S on the additional tray 23 from the additional tray 23.

The additional separation roller pair 312 transports the print medium S sheet by sheet to the additional transport roller pair 313 even when a plurality of sheets of the print medium S fed by the additional pickup roller 311 are placed on top of each other. The additional separation roller pair 312 includes a drive roller and a driven roller that is driven by the rotation of the drive roller.

The additional transport roller pair 313 includes a drive roller and a driven roller. The additional transport roller pair 313 transports the print medium S transported from the additional separation roller pair 312 to the apparatus main body 10 located above and adjacent to the first additional cassette 21A. The additional transport roller pair 313 also transports the print medium S transported from the additional cassette 21 located below the first additional cassette 21A to the apparatus main body 10 located above and adjacent to the first additional cassette 21A.

The additional transport roller pair 313 of the second additional cassette 21B transports the print medium S accommodated in the second additional cassette 21B to the first additional cassette 21A.

The first additional cassette 21A presses the print medium S against the additional pickup roller 311 by tilting the hopper plate 32. By using, for example, various rollers as described above, the print medium S accommodated in each of the main body cassette 17, the first additional cassette 21A, and the second additional cassette 21B is transported to the location of the ink jet head 282, where ink is ejected onto the surface of the print medium S, so that an image based on a print job is printed.

The configuration of a control system of the copier 1 will now be described.

Figure 3:
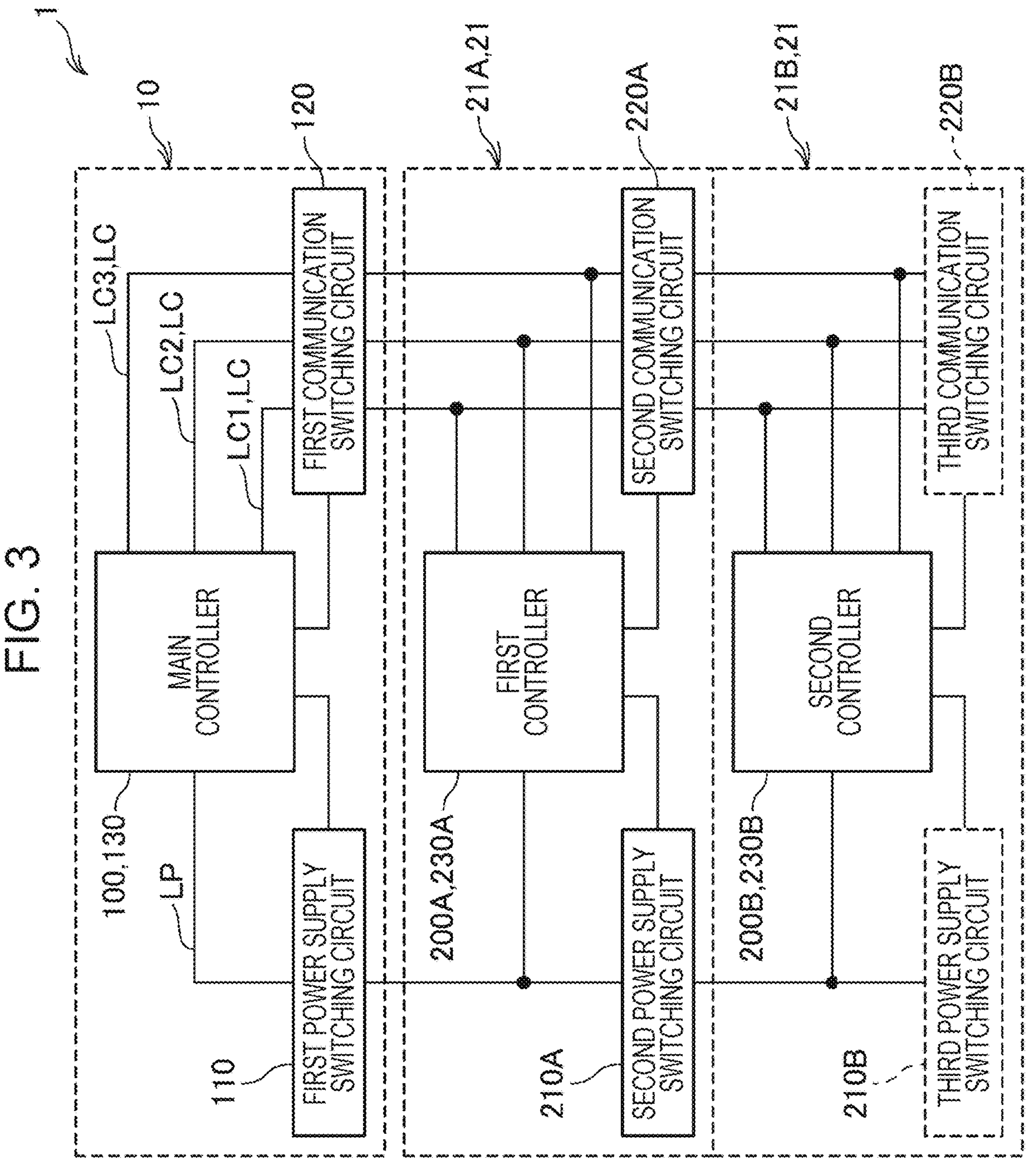
FIG. 3 is a block diagram illustrating an example of a control system of the copier.

FIG. 3 is a block diagram illustrating an example of a control system of the copier 1.

As illustrated in FIG. 3, the apparatus main body 10 includes a main controller 100, a first power supply switching circuit 110, a first communication switching circuit 120, and a main body communication interface 130.

In addition, the first additional cassette 21A includes a first controller 200A, a second power supply switching circuit 210A, a second communication switching circuit 220A, and a first communication interface 230A.

In addition, the second additional cassette 21B includes a second controller 200B, a third power supply switching circuit 210B, a third communication switching circuit 220B, and a second communication interface 230B.

The main controller 100 controls operation of components of the apparatus main body 10. In particular, the main controller 100 controls operation of the first power supply switching circuit 110, the first communication switching circuit 120, and the main body communication interface 130.

The main controller 100 is further described with reference to FIG. 4.

The apparatus main body 10 supplies power via a power supply line LP to the first additional cassette 21A.

The first power supply switching circuit 110 is a circuit that connects or disconnects the power supply line LP between the apparatus main body 10 and the first additional cassette 21A according to an instruction from the main controller 100. When the first power supply switching circuit 110 is connected, power is supplied from the apparatus main body 10 to components of the first additional cassette 21A.

When, for example, the main controller 100 detects that the first additional cassette 21A is coupled to the apparatus main body 10, the main controller 100 causes the first power supply switching circuit 110 to connect the power supply line LP between the apparatus main body 10 and the first additional cassette 21A. In addition, when, for example, the main controller 100 determines that communication with the first controller 200A of the first additional cassette 21A is unable to be established, the main controller 100 causes the first power supply switching circuit 110 to disconnect the power supply line LP between the apparatus main body 10 and the first additional cassette 21A.

The main body communication interface 130 includes communication hardware such as a connector and a communication circuit. A bus-type communication line LC to which the first controller 200A of the first additional cassette 21A and the second controller 200B of the second additional cassette 21B may be connected is connected to the main body communication interface 130. In other words, the first controller 200A of the first additional cassette 21A and the second controller 200B of the second additional cassette 21B are connected in a bus topology to the main body communication interface 130. The main controller 100 communicates with the first controller 200A of the first additional cassette 21A and the second controller 200B of the second additional cassette 21B via the communication line LC.

The communication line LC includes a first communication line LC1, a second communication line LC2, and a third communication line LC3. The main controller 100 transmits information, such as a command, to the first controller 200A and the second controller 200B via the first communication line LC1. The main controller 100 receives information, such as response information, from the first controller 200A and the second controller 200B via the second communication line LC2. The main controller 100 transmits and receives error information to and from the first controller 200A and the second controller 200B via the third communication line LC3.

The first communication switching circuit 120 connects and disconnects the communication line LC between the apparatus main body 10 and the first additional cassette 21A according to an instruction from the main controller 100. When the first communication switching circuit 120 is connected, communication is enabled between the main controller 100 of the apparatus main body 10 and the first controller 200A of the first additional cassette 21A.

For example, when the main controller 100 detects that the first additional cassette 21A is coupled to the apparatus main body 10, the main controller 100 causes the first communication switching circuit 120 to connect the communication line LC between the apparatus main body 10 and the first additional cassette 21A. In addition, when, for example, the main controller 100 determines that communication with the first controller 200A of the first additional cassette 21A is unable to be established, the main controller 100 causes the first communication switching circuit 120 to disconnect the communication line LC between the apparatus main body 10 and the first additional cassette 21A. When the first communication switching circuit 120 is disconnected, communication between the main controller 100 of the apparatus main body 10 and the first controller 200A of the first additional cassette 21A is disabled, although electrical noise propagating from the first controller 200A to the main controller 100, for example, may be blocked.

The first communication switching circuit 120 corresponds to an example of a first switching circuit.

The first controller 200A controls operation of components of the first additional cassette 21A according to an instruction from the main controller 100. In particular, the first controller 200A controls operation of the second power supply switching circuit 210A, the second communication switching circuit 220A, and the first communication interface 230A.

The first controller 200A is further described with reference to FIG. 4.

The apparatus main body 10 supplies power to the second additional cassette 21B via the power supply line LP.

The second power supply switching circuit 210A is a circuit that connects or disconnects the power supply line LP between the first additional cassette 21A and the second additional cassette 21B according to an instruction from the first controller 200A. When the second power supply switching circuit 210A is connected, power is supplied from the apparatus main body 10 to components of the second additional cassette 21B via the first additional cassette 21A.

When, for example, the main controller 100 detects that the second additional cassette 21B is coupled to the first additional cassette 21A, the first controller 200A causes the second power supply switching circuit 210A to connect the power supply line LP between the first additional cassette 21A and the second additional cassette 21B. In addition, when, for example, the main controller 100 determines that communication between the main controller 100 and the second controller 200B is unable to be established, the first controller 200A causes the second power supply switching circuit 210A to disconnect the power supply line LP between the first additional cassette 21A and the second additional cassette 21B.

The first communication interface 230A includes communication hardware such as a connector and a communication circuit. A bus-type communication line LC capable of communicating with the main controller 100 is connected to the first communication interface 230A. In other words, the first controller 200A is connected in a bus topology to the main body communication interface 130. The main controller 100 communicates with the first controller 200A via the communication line LC.

The second communication switching circuit 220A connects and disconnects the communication line LC between the first additional cassette 21A and the second additional cassette 21B according to an instruction from the first controller 200A. When the second communication switching circuit 220A is connected, communication is enabled between the main controller 100 of the apparatus main body 10 and the second controller 200B of the second additional cassette 21B.

When, for example, the main controller 100 detects that the second additional cassette 21B is coupled to the first additional cassette 21A, the main controller 100 causes the second communication switching circuit 220A to connect the communication line LC between the first additional cassette 21A and the second additional cassette 21B. In addition, when, for example, the main controller 100 determines that communication with the second controller 200B of the second additional cassette 21B is unable to be established, the main controller 100 causes the second communication switching circuit 220A to disconnect the communication line LC between the first additional cassette 21A and the second additional cassette 21B. When the second communication switching circuit 220A is disconnected, communication between the main controller 100 of the apparatus main body 10 and the second controller 200B of the second additional cassette 21B is disabled, although electrical noise propagating from the second controller 200B to the main controller 100 or the first controller 200A, for example, may be blocked.

The second communication switching circuit 220A corresponds to an example of a second switching circuit.

The second controller 200B controls operation of components of the second additional cassette 21B according to an instruction from the main controller 100. In particular, the second controller 200B controls operation of the third power supply switching circuit 210B, the third communication switching circuit 220B, and the second communication interface 230B.

The second controller 200B is further described with reference to FIG. 4.

When the additional cassette 21, for example, a third additional cassette 21C (not shown) is further mounted below the second additional cassette 21B, the apparatus main body 10 supplies power to the third additional cassette 21C via the power supply line LP.

The third power supply switching circuit 210B and the third communication switching circuit 220B do not operate in the present embodiment, and therefore the description is omitted.

The second communication interface 230B includes communication hardware such as a connector and a communication circuit. The bus-type communication line LC capable of communicating with the main controller 100 is connected to the second communication interface 230B. In other words, the second controller 200B is connected in a bus topology to the main body communication interface 130. The main controller 100 communicates with the second controller 200B via the communication line LC.

With reference to FIG. 4, the configuration of the main controller 100 is now described. FIG. 4 is a block diagram illustrating an example of the configuration of the main controller 100.

As illustrated in FIG. 4, the main controller 100 includes a main processor 100A that executes a program, such as a central processing unit (CPU), and a main memory 100B. The main controller 100 controls the components of the copier 1 by the main processor 100A reading out a main control program PG stored in the main memory 100B and executing the main control program PG. The main processor 100A executes the main control program PG stored in the main memory 100B to function as a connection instructor 101, a first determiner 102, a reconnection instructor 103, a second determiner 104, a reporter 105, a print controller 106, and a log processor 107. In addition, the main processor 100A executes the main control program PG stored in the main memory 100B to cause the main memory 100B to function as a log storage 108.

The main memory 100B is a memory that stores the main control program PG, other programs to be executed by the main processor 100A, data to be processed by the main processor 100A, and so on. The main memory 100B includes a nonvolatile storage area. In addition, the main memory 100B may include a volatile storage area to constitute a work area for the main processor 100A.

The operation panel 16, the printing unit 28, and the first communication interface 230A are connected to the main controller 100.

In the operation panel 16, various types of information are displayed on the display under the control of the main controller 100. For example, when the main controller 100 is unable to establish communication with the second controller 200B, the operation panel 16 reports that the second additional cassette 21B is unusable.

The printing unit 28, for example, forms an image on the print medium S supplied from the first additional cassette 21A under the control of the main controller 100.

The first controller 200A includes a first processor 201A that executes a program, such as a CPU, and a first memory 202A. The first memory 202A is a memory that stores a first control program, other programs to be executed by the first processor 201A, data to be processed by the first processor 201A, and so on. The first memory 202A includes a nonvolatile storage area. In addition, the first memory 202A may include a volatile storage area to constitute a work area for the first processor 201A.

The second controller 200B includes a second processor 201B that executes a program, such as a CPU, and a second memory 202B. The second memory 202B is a memory that stores a second control program, other programs to be executed by the second processor 201B, data to be processed by the second processor 201B, and so on. The second memory 202B includes a nonvolatile storage area. In addition, the second memory 202B may include a volatile storage area to constitute a work area for the second processor 201B.

The log storage 108 stores log information JL. The log information JL is stored in the log storage 108 according to an instruction of the log processor 107. The log information JL includes various commands, various types of response information, and so on.

The connection instructor 101 performs first connection processing PR1 of transmitting a first connection command CM1 to the first controller 200A. The first connection command CM1 is a command instructing the first controller 200A to establish communication with the main controller 100.

When the first controller 200A receives the first connection command CM1, the first controller 200A performs processing of establishing communication with the main controller 100. In addition, when the communication with the main controller 100 is established, the first controller 200A transmits first response information JA1 to the main controller 100. The first response information JA1 indicates that the first controller 200A has established communication with the main controller 100.

In addition, the connection instructor 101 performs second connection processing PR2 of transmitting a second connection command CM2 to the second controller 200B. The second connection command CM2 is a command instructing the second controller 200B to establish communication with the main controller 100.

When the second controller 200B receives the second connection command CM2, the second controller 200B performs processing of establishing communication with the main controller 100. In addition, when the communication with the main controller 100 is established, the second controller 200B transmits second response information JA2 to the main controller 100. The second response information JA2 indicates that the second controller 200B has established communication with the main controller 100.

The first determiner 102 determines whether a first condition CD1 is satisfied. The first condition CD1 is a condition indicating that the first response information JA1 be received from the first controller 200A and the second response information JA2 be not received from the second controller 200B.

When the first determiner 102 determines that the first condition CD1 is satisfied, the reconnection instructor 103 performs first reconnection processing RR1 of causing the first communication switching circuit 120 to disconnect communication and then causing the first communication switching circuit 120 to connect communication.

After the reconnection instructor 103 has performed the first reconnection processing RR1, the connection instructor 101 performs the first connection processing PR1 again.

After the reconnection instructor 103 has performed the first reconnection processing RR1, the reconnection instructor 103 performs second reconnection processing RR2 of causing the first controller 200A to disconnect the second communication switching circuit 220A and then causing the first controller 200A to cause the second communication switching circuit 220A to connect communication.

After the reconnection instructor 103 has performed the second reconnection processing RR2, the connection instructor 101 performs the second connection processing PR2 again.

The second determiner 104 determines whether a second condition CD2 is satisfied. The second condition CD2 is a condition indicating that, despite the second connection processing PR2 being performed a predetermined number N of times larger than or equal to two times, the main controller 100 receives the first response information JA1 from the first controller 200A and does not receive the second response information JA2 from the second controller 200B. The predetermined number N of times is, for example, three times.

When the second determiner 104 determines that the second condition CD2 is satisfied, the reconnection instructor 103 maintains communication with the first controller 200A and discards communication with the second controller 200B.

As used herein, discarding communication with the second controller 200B means that it is determined that communication with the second controller 200B is unable to be performed and that, thereafter, processing of establishing communication with the second controller 200B will not be voluntarily performed. However, even after communication with the second controller 200B has been discarded, in response to an input from the outside or a situation change, the reconnection instructor 103 may perform again processing for establishing communication with the second controller 200B. Examples of the input from the outside or the situation change include the case in which the main controller 100 receives an instruction from the user via the operation panel 16, and the case in which restart of the copier 1 is performed.

When the second determiner 104 determines that the second condition CD2 is satisfied, the reporter 105 reports that the second additional cassette 21B is unusable. For example, the reporter 105 displays character information "The second additional cassette is unusable." on the display of the operation panel 16.

When the second determiner 104 determines that the second condition CD2 is satisfied, the print controller 106 causes the printing unit 28, for example, to execute a print job for the print medium S stored in the first additional cassette 21A. In addition, when the second determiner 104 determines that the second condition CD2 is satisfied, the print controller 106 causes the printing unit 28, for example, to execute a print job for the print medium S stored in the main body cassette 17.

When the second determiner 104 determines that the first response information JA1 is received from the first controller 200A and the second response information JA2 is received from the second controller 200B, the log processor 107 transmits a log request command CM3 to the second controller 200B. The log request command CM3 is a command that requests the second controller 200B to transmit the log information JL.

When the second controller 200B receives the log request command CM3, the second controller 200B transmits the log information JL. For example, in a time period from a time point at which the second connection processing PR2 is performed for the first time by the connection instructor 101 to a time point at which the second determiner 104 determines receipt of the second response information JA2, the log information JL includes the following information. That is, the log information JL includes the second connection command CM2 and the log request command CM3 received from the main controller 100 by the second controller 200B, and the second response information JA2 transmitted to the main controller 100 by the second controller 200B. The second controller 200B stores the log information JL in the second memory 202B.

With reference to FIGS. 5 to 8, operation of the copier 1 is now described.

Figure 5:
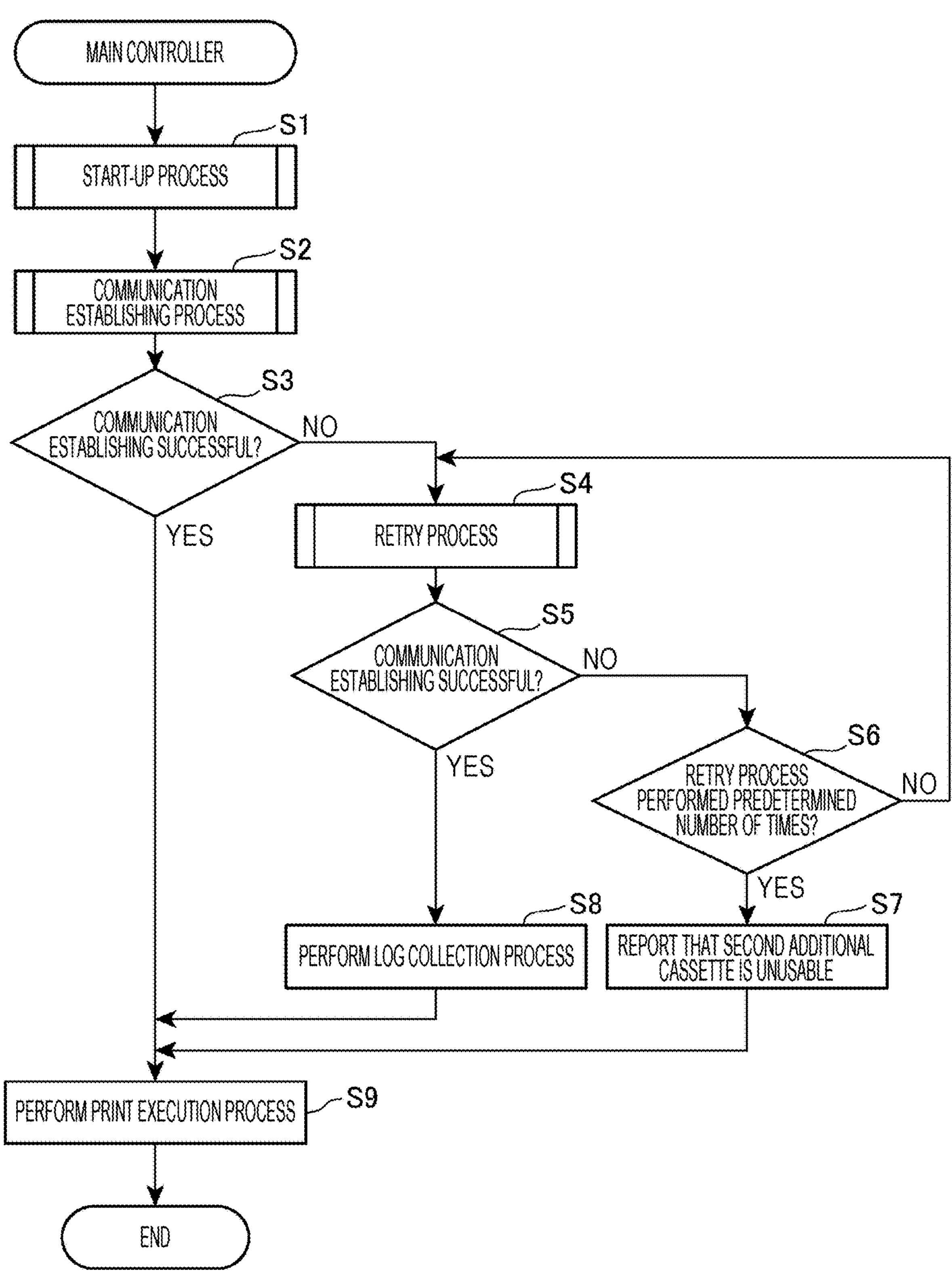
FIG. 5 is a flowchart presenting an example of processes performed by the main controller.

FIG. 5 is a flowchart presenting an example of processes of the main controller 100.

As presented in FIG. 5, at step S1, the main controller 100 performs a start-up process. The start-up process, as used herein, is a process of turning on (connecting) the first power supply switching circuit 110 and the second power supply switching circuit 210A to start the first controller 200A and the second controller 200B. The start-up process will be further described with reference to FIG. 6.

Subsequently, at step S2, the main controller 100 performs a communication establishing process. The communication establishing process, as used herein, is a process of turning on (connecting) the first communication switching circuit 120 and the second communication switching circuit 220A to establish communication with the first controller 200A and the second controller 200B. The communication establishing process will be further described with reference to FIG. 7.

Subsequently, at step S3, the first determiner 102 determines whether the communication establishing process is successful. That is, the first determiner 102 determines whether the first response information JA1 is received from the first controller 200A and the second response information JA2 is received from the second controller 200B. In other words, the first determiner 102 determines whether the first response information JA1 and the second response information JA2 are received.

If the first determiner 102 determines that both the first response information JA1 and the second response information JA2 are received (YES at step S3), the process proceeds to step S9. If the first determiner 102 determines that at least one of the first response information JA1 and the second response information JA2 is not received (NO at step S3), the process proceeds to step S4.

Hereafter, at steps following step S3, a description will be given of the case in which the first determiner 102 determines that the first response information JA1 is received and the second response information JA2 is not received, as the case in which the first determiner 102 determines that at least one of the first response information JA1 and the second response information JA2 is not received (NO at step S3). That is, a description will be given of the case in which the first determiner 102 determines that the first condition CD1 is satisfied.

Then, at step S4, the main controller 100 performs a retry process. The retry process, as used herein, is a process of turning off (disconnecting) the first communication switching circuit 120 and the second communication switching circuit 220A and then turning on (connecting) the first communication switching circuit 120 and the second communication switching circuit 220A to establish communication with the first controller 200A and the second controller 200B.

The retry process will be further described with reference to FIG. 8.

Subsequently, at step S5, the first determiner 102 determines whether the communication establishing process in the retry process is successful. That is, the first determiner 102 determines whether the first response information JA1 is received from the first controller 200A and the second response information JA2 is received from the second controller 200B. In other words, the first determiner 102 determines whether the first response information JA1 and the second response information JA2 are received.

If the first determiner 102 determines that the communication establishing process in the retry process is successful (YES at step S5), the process proceeds to step S8.

Then, at step S8, the log processor 107 performs a log collection process. Thereafter, the process proceeds to step S9.

The log collection process is a process of collecting the log information JL from the second controller 200B. Specifically, in the log collection process, the following processing is performed. First, the log processor 107 transmits the log request command CM3 to the second controller 200B. The log request command CM3 is a command that requests the second controller 200B to transmit the log information JL. When the second controller 200B receives the log request command CM3, the second controller 200B transmits the log information JL. Then, the log processor 107 receives the log information JL from the second controller 200B and causes the log information JL to be stored in the log storage 108.

If the first determiner 102 determines that the communication establishing process in the retry process is not successful (NO at step S5), the process proceeds to step S6.

Then, at step S6, the main controller 100 determines whether the retry process has been performed the predetermined number N of times.

If the main controller 100 determines that the retry process has not been performed the predetermined number N of times (NO at step S6), the process returns to step S4. If the main controller 100 determines that the retry process has been performed the predetermined number N of times (YES at step S6), the process proceeds to step S7.

Then, at step S7, the reconnection instructor 103 maintains communication with the first controller 200A and discards communication with the second controller 200B, and the reporter 105 reports that the second additional cassette 21B is unusable. Thereafter, the process proceeds to step S9.

Then, at step S9, the print controller 106 performs a print execution process. The print execution process is a process of causing the printing unit 28 to execute a print job. For example, the print execution process is a process of causing the printing unit 28 to, for example, execute a print job for the print medium S stored in the first additional cassette 21A.

Thereafter, the process terminates.

Figure 6:
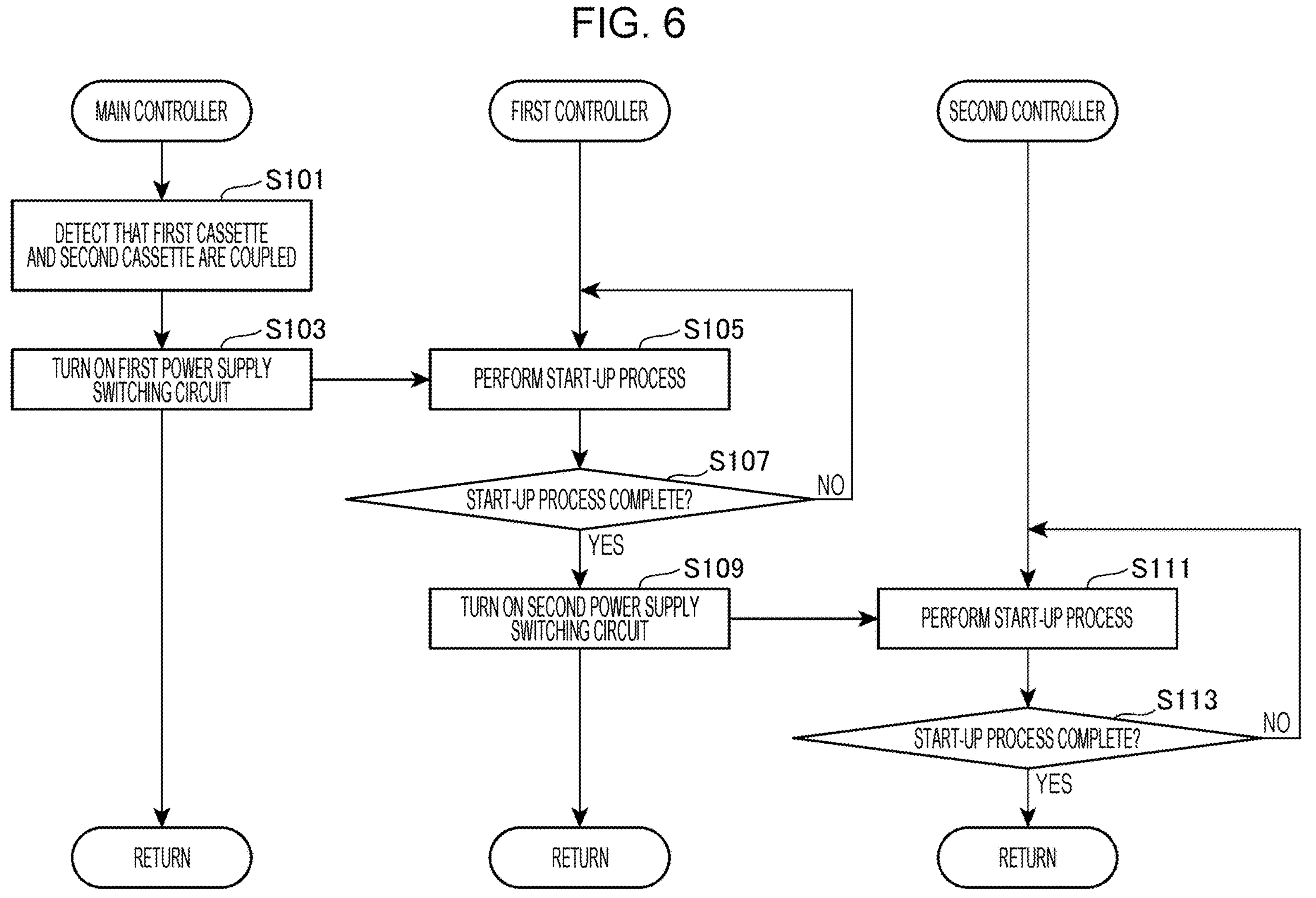
FIG. 6 is a flowchart presenting an example of a start-up process by the main controller, a first controller, and a second controller.

With reference to FIG. 6, the start-up process performed at step S1 of the flowchart presented in FIG. 5 is now described. FIG. 6 is a flowchart presenting an example of the start-up process performed by the main controller 100, the first controller 200A, and the second controller 200B.

First, at step S101, the main controller 100 detects that the first additional cassette 21A and the second additional cassette 21B are coupled.

Subsequently, at step S103, the main controller 100 turns on (connects) the first power supply switching circuit 110. As a result, power is supplied from the apparatus main body 10 through the first power supply switching circuit 110 to the first controller 200A.

Subsequently, at step S105, the first controller 200A performs the start-up process.

Subsequently, at step S107, the first controller 200A determines whether the start-up process is complete.

If the first controller 200A determines that the start-up process is not complete (NO at step S107), the process returns to step S105. If the first controller 200A determines that the start-up process is complete (YES at step S107), the process proceeds to step S107.

Then, at step S109, the first controller 200A turns on (connects) the second power supply switching circuit 210A. As a result, power is supplied from the apparatus main body 10 sequentially through the first power supply switching circuit 110 and the second power supply switching circuit 210A to the second controller 200B.

Subsequently, at step S111, the second controller 200B performs the start-up process.

Subsequently, at step S113, the second controller 200B determines whether the start-up process is complete.

If the second controller 200B determines that the start-up process is not complete (NO at step S113), the process returns to step S111. If the second controller 200B determines that the start-up process is complete (YES at step S113), the process returns to step S2 of the flowchart presented in FIG. 5.

With reference to FIG. 7, the communication establishing process performed at step S2 of the flowchart presented in FIG. 5 is now described. FIG. 7 is a flowchart presenting an example of the communication establishing process performed by the main controller 100, the first controller 200A, and the second controller 200B.

Initially, at step S201, the main controller 100 turns on (connects) the first communication switching circuit 120.

Subsequently, at step S203, the connection instructor 101 transmits the first connection command CM1 to the first controller 200A. The first connection command CM1 is a command instructing that communication with the main controller 100 be established.

Subsequently, at step S205, the first controller 200A receives the first connection command CM1.

Subsequently, at step S207, the first controller 200A performs processing of establishing communication with the main controller 100.

Subsequently, at step S209, the first controller 200A determines whether establishment of communication with the main controller 100 is successful.

If the first controller 200A determines that the establishment of communication with the main controller 100 is not successful due to some error (NO at step S209), the process returns to step S3 of the flowchart presented in FIG. 5. In addition to this case, if some error has occurred at step S205 or at step S207 and therefore the process has not reached step S209, the first controller 200A does not, or is unable to, transmit the first response information JA1 to the main controller 100.

In contrast, if the first controller 200A determines that the establishment of communication with the main controller 100 is successful (YES at step S209), the process proceeds to step S211. Then, at step S211, the first controller 200A transmits the first response information JA1 to the main controller 100.

Subsequently, at step S213, the main controller 100 receives the first response information JA1.

Subsequently, at step S215, the main controller 100 transmits, to the first controller 200A, a command CM instructing that the second communication switching circuit 220A be turned on (connected).

Subsequently, at step S217, the first controller 200A receives the command CM from the main controller 100 and turns on (connects) the second communication switching circuit 220A.

Subsequently, at step S219, the connection instructor 101 transmits the second connection command CM2 to the second controller 200B. The second connection command CM2 is a command instructing that communication with the main controller 100 be established.

Subsequently, at step S221, the second controller 200B receives the second connection command CM2.

Subsequently, at step S223, the second controller 200B performs processing of establishing communication with the main controller 100.

Subsequently, at step S225, the second controller 200B determines whether establishment of communication with the main controller 100 is successful.

If the second controller 200B determines that the establishment of communication with the main controller 100 is not successful (NO at step S225), the process returns to step S3 of the flowchart presented in FIG. 5. In addition to such a case, when some error has occurred at step S221 or at step S223 and therefore the process does not reach step S225, the second controller 200B does not, or is unable to, transmit the second response information JA2 to the main controller 100.

In contrast, if the second controller 200B determines that the establishment of communication with the main controller 100 is successful (YES at step S225), the process proceeds to step S227.

Then, at step S227, the second controller 200B transmits the second response information JA2 to the main controller 100. Subsequently, at step S229, the main controller 100 receives the second response information JA2. Thereafter, the process returns to step S3 of the flowchart presented in FIG. 5.

With reference to FIG. 8, the retry process performed at step S4 of the flowchart presented in FIG. 5 is now described. FIG. 8 is a flowchart presenting, by way of example, the retry process that is performed by the main controller 100, the first controller 200A, and the second controller 200B when the first determiner 102 determines that the first response information JA1 is received and the second response information JA2 is not received.

The retry process differs from the communication establishing process presented in FIG. 7 in that the first communication switching circuit 120 and the second communication switching circuit 220A are turned off (disconnected) and then the first communication switching circuit 120 and the second communication switching circuit 220A are turned on (connected). Specifically, the flowchart presented in FIG. 8 differs from the flowchart presented in FIG. 7 particularly in that the flowchart in FIG. 8 includes steps S401 to S405. Steps S407 to S435 of the flowchart presented in FIG. 8 correspond to steps S201 to S229 of the flowchart presented in FIG. 7.

Initially, at step S401, the reconnection instructor 103 transmits, to the first controller 200A, the command CM instructing that the second communication switching circuit 220A be turned off (disconnected).

Subsequently, at step S403, the first controller 200A receives the command CM and turns off (disconnects) the second communication switching circuit 220A.

Subsequently, at step S405, the reconnection instructor 103 turns off (disconnects) the first communication switching circuit 120.

Subsequently, at step S407, the reconnection instructor 103 turns on (connects) the first communication switching circuit 120.

In such a manner, when the first determiner 102 receives the first response information JA1 and does not receive the second response information JA2, the first communication switching circuit 120 is temporarily disconnected so as to disconnect not only the second controller 200B but also the first controller 200A from the main controller 100.

Turning back to step S3 of the flowchart presented in FIG. 5, it is determined by the first determiner 102 that the first response information JA1 is received and the second response information JA2 is not received. Two causes are conceivable for this determination. One cause is an error that has occurred in a component of the second additional cassette 21B. The other cause is that because of an error that has occurred in a component of the first additional cassette 21A, a command from the main controller 100 to the second controller 200B is not normally delivered.

Temporary disconnection of the first communication switching circuit 120 disconnects communication between the main controller 100 and the first additional cassette 21A and disconnects communication between the main controller 100 and the second additional cassette 21B. Accordingly, the chance of recovery from an error in which the first determiner 102 does not receive the second response information JA2 may be increased even when the error results from an error that has occurred in a component of the first additional cassette 21A and also even when the error results from an error that has occurred in a component of the second additional cassette 21B.

Subsequently, at step S409, the connection instructor 101 transmits the first connection command CM1 to the first controller 200A. The first connection command CM1 is a command instructing that communication with the main controller 100 be established.

Subsequently, at step S411, the first controller 200A receives the first connection command CM1.

Subsequently, at step S413, the first controller 200A performs processing of establishing communication with the main controller 100.

Subsequently, at step S415, the first controller 200A determines whether establishment of communication with the main controller 100 is successful.

If the first controller 200A determines that the establishment of communication with the main controller 100 is not successful (NO at step S415), the process returns to step S5 of the flowchart presented in FIG. 5. If the first controller 200A determines that the establishment of communication with the main controller 100 is successful (YES at step S415), the process proceeds to step S417.

Then, at step S417, the first controller 200A transmits the first response information JA1 to the main controller 100.

Subsequently, at step S419, the main controller 100 receives the first response information JA1.

Subsequently, at step S421, the main controller 100 transmits, to the first controller 200A, the command CM instructing that the second communication switching circuit 220A be turned on (connected).

Subsequently, at step S423, the first controller 200A receives the command CM from the main controller 100 and turns on (connects) the second communication switching circuit 220A.

Subsequently, at step S425, the connection instructor 101 transmits the second connection command CM2 to the second controller 200B. The second connection command CM2 is a command instructing that communication with the main controller 100 be established.

Subsequently, at step S427, the second controller 200B receives the second connection command CM2.

Subsequently, at step S429, the second controller 200B performs processing of establishing communication with the main controller 100.

Subsequently, at step S431, the second controller 200B determines whether establishment of communication with the main controller 100 is successful.

If the first controller 200A determines that the establishment of communication with the main controller 100 is not successful (NO at step S431), the process returns to step S5 of the flowchart presented in FIG. 5. If the second controller 200B determines that the establishment of communication with the main controller 100 is successful (YES at step S431), the process proceeds to step S433.

Then, at step S433, the second controller 200B transmits the second response information JA2 to the main controller 100.

Subsequently, at step S435, the main controller 100 receives the second response information JA2. Thereafter, the process returns to step S5 of the flowchart presented in FIG. 5.

As described above, the copier 1 includes the apparatus main body 10 including the printing unit 28, the main controller 100, and the first communication switching circuit 120 configured to connect or disconnect communication; the first additional cassette 21A including the first controller 200A configured to communicate with the main controller 100 via the first switching circuit 120; and the second additional cassette 21B including the second controller 200B configured to communicate with the main controller 100 via the first communication switching circuit 120. The main controller 100 is configured to perform the first connection processing PR1 of transmitting, to the first controller 200A, the first connection command CM1 that provides an instruction for establishing communication with the main controller 100, and to perform the second connection processing PR2 of transmitting, to the second controller 200B, the second connection command CM2 that provides an instruction for establishing communication with the main controller 100. The main controller 100 is configured to, when receiving, from the first controller 200A, the first response information JA1 indicating establishment of communication with the main controller 100 and not receiving, from the second controller 200B, the second response information JA2 indicating establishment of communication with the main controller 100, perform the first reconnection processing RR1 of causing the first communication switching circuit 120 to disconnect communication and then causing the first communication switching circuit 120 to connect communication, and, after performing the first reconnection processing RR1, perform the first connection processing PR1 again.

According to this, when the first response information JA1 is received and the second response information JA2 is not received, the first reconnection processing RR1 is performed, and after the first reconnection processing RR1 has been performed, the first connection processing PR1 is performed again. The first reconnection processing RR1 is processing of causing the first communication switching circuit 120 to disconnect communication and then causing the first communication switching circuit 120 to connect communication. Therefore, regarding a communication error in which communication between the second controller 200B and the main controller 100 is not established, the effect of this communication error on a communication error in the first communication switching circuit 120 may be reduced. This may increase the chance of recovery from the communication error in which communication between the second controller 200B and the main controller 100 is not established.

In addition, in the copier 1, the first additional cassette 21A further includes the second communication switching circuit 220A for which the first controller 200A controls connection or disconnection of communication, and the second controller 200B is configured to communicate with the main controller 100 via the first communication switching circuit 120 and the second communication switching circuit 220A. After performing the first reconnection processing RR1, the main controller 100 performs the second reconnection processing RR2 of causing the first controller 200A to disconnect the second communication switching circuit 220A and then causing the first controller 200A to cause the second communication switching circuit 220A to connect communication.

According to this, after the first reconnection processing RR1 has been performed, the second reconnection processing RR2 is performed. The second reconnection processing RR2 is processing of causing the second communication switching circuit 220A to be disconnected and then causing the second communication switching circuit 220A to connect communication. Therefore, regarding a communication error in which communication between the second controller 200B and the main controller 100 is not established, the effect of this communication error on a communication error in the second communication switching circuit 220A may be reduced. This may increase the chance of recovery from the communication error in which communication between the second controller 200B and the main controller 100 is not established.

In addition, in the copier 1, after performing the second reconnection processing RR2, the main controller 100 performs the second connection processing PR2 again.

According to this, after the second reconnection processing RR2 has been performed, the second connection processing PR2 is performed again. This may reduce a communication error in which the second controller 200B and the main controller 100 do not communicate with each other. This reduction may increase the chance of recovery from the communication error in which communication between the second controller 200B and the main controller 100 is not established.

In addition, in the copier 1, when, despite the second connection processing PR2 being performed a predetermined number N of times larger than or equal to two times, the main controller 100 receives the first response information JA1 from the first controller 200A and does not receive the second response information JA2 from the second controller 200B, the main controller 100 is configured to maintain communication with the first controller 200A and to discard communication with the second controller 200B.

According to this, by setting the predetermined number N of times to a proper number of times, the main controller 100 may properly discard communication with the second controller 200B. This may reduce malfunctions and other defects in the second additional cassette 21B caused by defective communication between the main controller 100 and the second controller 200B.

In addition, in the copier 1, when, despite the second connection processing PR2 being performed a predetermined number N of times larger than or equal to two times, the main controller 100 receives the first response information JA1 from the first controller 200A and does not receive the second response information JA2 from the second controller 200B, the main controller 100 is configured to report that the second additional cassette 21B is unusable.

According to this, the user may easily check that the second additional cassette 21B is unusable. This may improve the convenience of the user.

In addition, in the copier 1, when, despite the second connection processing RR2 being performed the predetermined number N of times larger than or equal to two times, the main controller 100 receives the first response information JA1 from the first controller 200A and does not receive the second response information JA2 from the second controller 200B, the main controller 100 is configured to cause the printing unit 28 to perform a print job for the print medium S stored in the first additional cassette 21A.

According to this, when communication with the second controller 200B is unable to be established, the main controller 100 may execute a print job for the print medium S stored in the first additional cassette 21A. This may improve the convenience of the user.

In addition, in the copier 1, when, as a result of the second connection processing PR2 being performed a plurality of times, the main controller 100 receives the first response information JA1 from the first controller 200A and receives the second response information JA2 from the second controller 200B, the main controller 100 is configured to transmit, to the second controller 200B, the log request command CM3 that requests transmission of the log information JL, and the second controller 200B is configured to, in response to the log request command CM3, transmit the log information JL to the main controller 100.

According to this, when, as a result of the second connection processing PR2 being performed a plurality of times, the main controller 100 receives the second response information JA2 from the second controller 200B, the main controller 100 may obtain the log information JL from the second controller 200B. Therefore, a person in charge of maintenance or the like of the copier 1 may analyze the cause of the occurrence of a communication error based on the log information JL. Accordingly, the convenience of a user, such a person in charge of maintenance or the like of the copier 1, may be improved.

In addition, in the copier 1, the log information JL includes the second connection command CM2 and the log request command CM3 received by the second controller 200B and the second response information JA2 transmitted by the second controller 200B during a time period from the second connection processing PR2 performed for the first time by the main controller 100 to receipt of the second response information JA2 performed by the main controller 100.

According to this, the main controller 100 may obtain proper information as the log information JL. Therefore, a person in charge of maintenance or the like of the copier 1 may analyze the cause of the occurrence of a communication error based on the log information JL. Accordingly, the convenience of a user, such a person in charge of maintenance or the like of the copier 1, may be improved. In addition, by using analysis of the cause of the occurrence of a communication error, the main control program PG may be updated to reduce the communication error occurrence and may increase the chance of recovery from a communication error if the communication error has occurred.

In addition, there is provided a method for controlling the copier 1 including the main body 10 including the printing unit 28, the main controller 100, and the first communication switching circuit 120 configured to connect or disconnect communication; the first additional cassette 21A including the first controller 200A configured to communicate with the main controller 100 via the first communication switching circuit 120; and the second cassette 21B including the second controller 200B configured to communicate with the main controller 100 via the first communication switching circuit 120. The main controller 100 performs the first connection processing PR1 of transmitting, to the first controller 200A, the first connection command CM1 that provides an instruction for establishing communication with the main controller 100, and performs the second connection processing PR2 of transmitting, to the second controller 200B, the second connection command CM2 that provides an instruction for establishing communication with the main controller 100. When the main controller 100 receives, from the first controller 200A, the first response information JA1 indicating establishment of communication with the main controller 100 and does not receive, from the second controller 200B, the second response information JA2 indicating establishment of communication with the main controller 100, the main controller 100 performs the first reconnection processing RR1 of causing the first communication switching circuit 120 to disconnect communication and then causing the first communication switching circuit 120 to connect communication, and, after performing the first reconnection processing RR1, performs the first connection processing PR1 again.

According to this, the effects similar to the effects of the copier 1 described above are achieved.

The embodiment described above merely illustrates a specific example to which the present disclosure is applied. The present disclosure is not limited to the configurations of the embodiment described above and may be implemented in various aspects without departing from the spirit and scope of the disclosure.

Although, in the embodiment described above, the first additional cassette 21A and the second additional cassette 21B are disposed in the copier 1, the present disclosure is not limited to this. Three or more additional cassettes may be disposed in the copier 1.

Although, in the embodiment described above, the first communication switching circuit 120 is configured as a separate component from the main controller 100, the first communication switching circuit 120 may be configured integrally with the main controller 100. In addition, although, in the above description, the second communication switching circuit 220A is configured as a separate component from the first controller 200A, the second communication switching circuit 220A may be configured integrally with the first controller 200A.

In the embodiment described above, mainly, the main controller 100 receives the first response information JA1 and does not receive the second response information JA2. However, the present disclosure is not limited to this.

For example, when the main controller 100 does not receive the first response information JA1 and the second response information JA2, the main controller 100 performs the retry process, for example, a predetermined number of times until the main controller 100 receives the first response information JA1. In this case, as the retry process, a process of turning off the first communication switching circuit 120 and then turning on the first communication switching circuit 120 to establish communication with the first controller 200A is performed. Then, when communication with the first controller 200A is established and the first response information JA1 is received, the process described in the above embodiment is performed.

Although, in the embodiment described above, the predetermined number N of times is three times, the present disclosure is not limited to this. The predetermined number N of times may be one time, two times, or four or more times.

In addition, the configuration may be such that the predetermined number N of times is settable by a user, such as a person in charge of maintenance or the like, for example, through an operation on the operation panel 16.

Each of the main processor 100A, the first processor 201A, and the second processor 201B may be composed of a single processor or may be composed of a plurality of processors. In addition, each of the main processor 100A, the first processor 201A, and the second processor 201B may be hardware programmed to implement a corresponding functional unit. That is, each of the main processor 100A, the first processor 201A, and the second processor 201B may be, for example, an application specific integrated circuit (ASIC) or a field programmable gate array (FPGA).

The components of the copier 1 illustrated in FIGS. 3 and 4 are exemplary, and specific implementations thereof are not limited. That is, hardware corresponding to the components may not be necessarily implemented, and the configuration may, of course, be such that the functions of the components are implemented by a single processor executing programs. In addition, some of the functions implemented by software in the embodiment described above may be hardware. Alternatively, some of the functions implemented by hardware may be implemented by software. Furthermore, the specific detailed configurations of the other components of the copier 1 may be arbitrarily changed.

The step units of the operations presented in FIGS. 5 to 8 are those into which the processing of the main controller 100, the first controller 200A, and the second controller 200B of the copier 1 is divided according to the main processing content for ease of understanding, and the present disclosure will not be limited by how the processing is divided into units and what are the names of the units. The processing may be divided into more step units according to the processing content. In addition, the processing may be divided such that one step unit includes more processing. In addition, the processing order may be changed appropriately without departing from the sprit and scope of the present disclosure.

What is claimed is:

1. A printing apparatus comprising:

a main body including a printing section, a main controller, and a first switching circuit configured to connect or disconnect communication;

a first cassette including a first controller configured to communicate with the main controller via the first switching circuit; and a second cassette including a second controller configured to communicate with the main controller via the first switching circuit, wherein the main controller is configured to perform first connection processing of transmitting, to the first controller, a first connection command that provides an instruction for establishing communication with the main controller, and perform second connection processing of transmitting, to the second controller, a second connection command that provides an instruction for establishing communication with the main controller, and the main controller is configured to, when receiving, from the first controller, first response information indicating establishment of communication with the main controller and not receiving, from the second controller, second response information indicating establishment of communication with the main controller, perform first reconnection processing of causing the first switching circuit to disconnect communication and then causing the first switching circuit to connect communication, and after performing the first reconnection processing, perform the first connection processing again.

2. The printing apparatus according to claim 1, wherein the first cassette further includes a second switching circuit for which the first controller controls connection or disconnection of communication, the second controller is configured to communicate with the main controller via the first switching circuit and the second switching circuit, and the main controller is configured to, after performing the first reconnection processing, perform second reconnection processing of causing the first controller to disconnect the second switching circuit and then causing the first controller to cause the second switching circuit to connect communication.

3. The printing apparatus according to claim 2, wherein the main controller is configured to, after performing the second reconnection processing, perform the second connection processing again.

4. The printing apparatus according to claim 3, wherein when, despite the second connection processing being performed a predetermined number of times larger than or equal to two times, the main controller receives the first response information from the first controller and does not receive the second response information from the second controller, the main controller is configured to maintain communication with the first controller and to discard communication with the second controller.

5. The printing apparatus according to claim 4, wherein when, despite the second connection processing being performed a predetermined number of times larger than or equal to two times, the main controller receives the first response information from the first controller and does not receive the second response information from the second controller, the main controller is configured to report that the second cassette is unusable.

6. The printing apparatus according to claim 5, wherein when, despite the second connection processing being performed a predetermined number of times larger than or equal to two times, the main controller receives the first response information from the first controller and does not receive the second response information from the second controller, the main controller is configured to cause the printing section to perform a print job for a print medium stored in the first cassette.

7. The printing apparatus according to claim 3, wherein when, as a result of the second connection processing being performed a plurality of times, the main controller receives the first response information from the first controller and receives the second response information from the second controller, the main controller is configured to transmit, to the second controller, a log request command that requests transmission of log information, and the second controller is configured to, in response to the log request command, transmit the log information to the main controller.

8. The printing apparatus according to claim 7, wherein the log information includes the second connection command and the log request command received by the second controller and the second response information transmitted by the second controller during a time period from the second connection processing performed for a first time by the main controller to receipt of the second response information by the main controller.

9. A method for controlling a printing apparatus including a main body including a printing section, a main controller, and a first switching circuit configured to connect or disconnect communication; a first cassette including a first controller configured to communicate with the main controller via the first switching circuit; and a second cassette including a second controller configured to communicate with the main controller via the first switching circuit, the method comprising:

by the main controller, performing first connection processing of transmitting, to the first controller, a first connection command that provides an instruction for establishing communication with the main controller, and performing second connection processing of transmitting, to the second controller, a second connection command that provides an instruction for establishing communication with the main controller, and by the main controller, when receiving, from the first controller, first response information indicating establishment of communication with the main controller and not receiving, from the second controller, second response information indicating establishment of communication with the main controller, performing first reconnection processing of causing the first switching circuit to disconnect communication and then causing the first switching circuit to connect communication, and after performing the first reconnection processing, performing the first connection processing again.

* * * * *